UNITED STATES PATENT OFFICE.

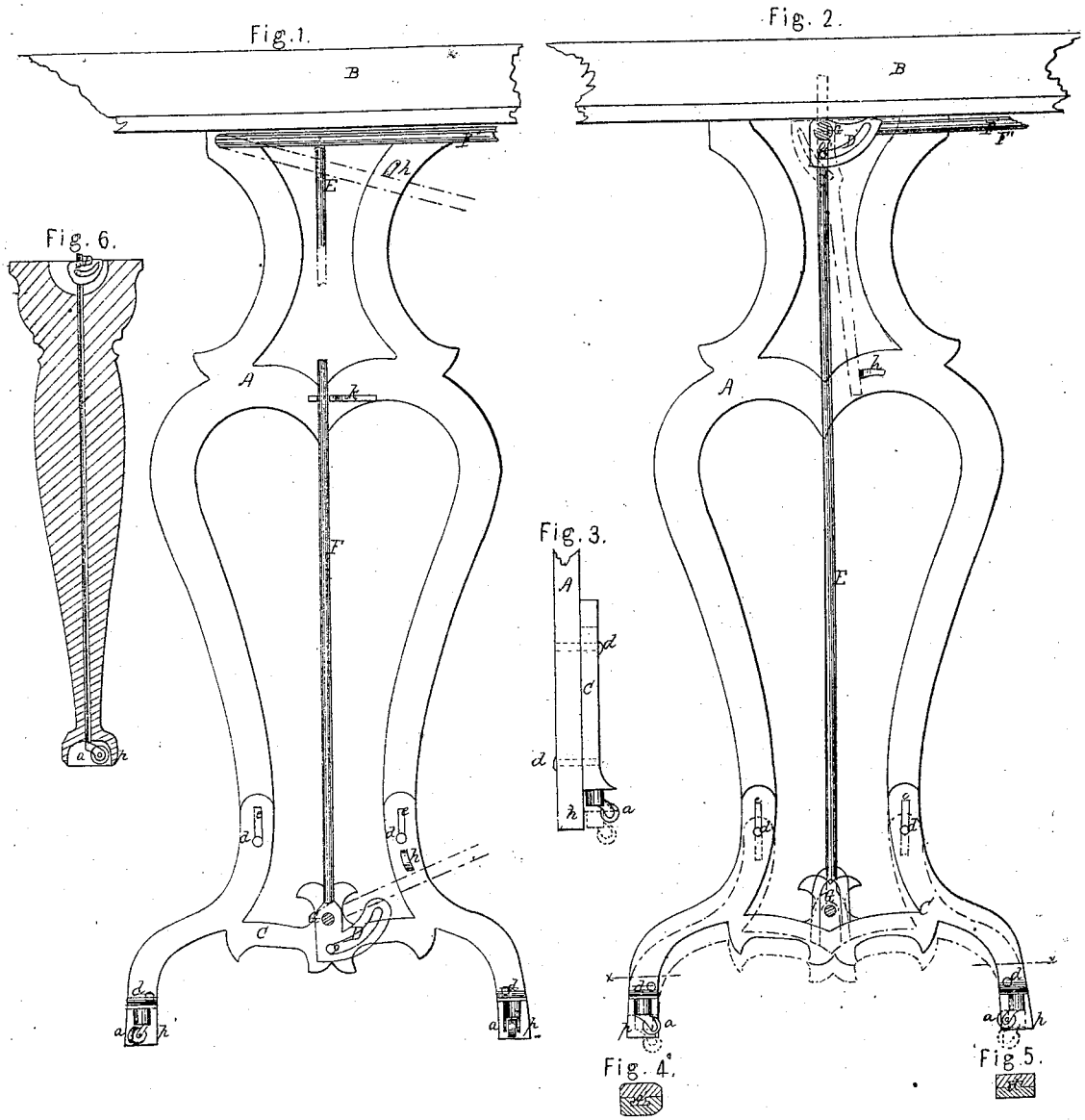

WILLIAM C. DODGE, OF WASHINGTON, DISTRICT OF COLUMBIA.

IMPROVED ADJUSTABLE CASTER.

Specification forming part of Letters Patent No. 42,754, dated May 17, 1864.

*To all whom it may concern:*

Be it known that I, WILLIAM C. DODGE, of Washington city, in the District of Columbia, have invented certain new and useful Improvements in Household Implements; and I do hereby declare that the following is a full and exact description thereof, reference being had to the accompanying drawings, making part of this specification, and to the letters of reference marked thereon, in which—

Figure 1 is a front elevation of the inner side of the legs of a sewing-machine with my improvement attached. Fig. 2 is a similar view, showing a modification of the same. Fig. 3 is an edge view of a portion of Figs. 1 and 2; and Figs. 4 and 5 are detached views of the lower portion of the legs and the attachment, taken in the line $x$ $x$, Fig. 2.

Like letters indicate corresponding parts in all the figures.

The nature of my invention consists in providing household implements with caster-wheels, which are so attached as to be adjustable, thereby enabling the operator to cause the implement to rest on or off the caster-wheels at pleasure.

To enable others skilled in the art to make and use my invention, I will proceed to describe its construction and operation.

A, Fig. 1, represents the inner face of the ordinary frame or legs, attached to one end of a sewing-machine table, B.

C represents a duplicate frame corresponding with the lower portion of A, and having caster-wheels $a$ attached to its feet or lower ends. This frame C is so attached to A that it can be raised or lowered at pleasure. When raised the machine stands upon the stationary or solid feet $p$ of the frame A, as shown in Figs. 1 and 3; but when the frame C is depressed the weight of the machine or implement is thrown upon the caster-wheels $a$, as clearly shown in red in Figs. 2 and 3, and this constitutes the gist of my invention.

The frame C may be attached to the frame A, in case such a frame be used, or to inside of a cabinet-case, if such be used, in any suitable manner to permit the desired movement. In the drawings I have shown it attached by means of the pins or bolts $d$, working or moving in the slots $e$, which is one of the most obvious and inexpensive methods of applying my improvement or invention to machines already in use. It is obvious, however, that many other methods of attaching or securing the parts together may be adopted.

The frame C with its casters may be operated or adjusted by a great variety of mechanical means. One of the simplest and most obvious methods is that shown in Fig. 1, in which G represents the ordinary rod to which the treadle for operating the machine is attached. At both ends of this rod G, on the inner side of the frame C, is rigidly attached a slotted cam or eccentric, D, the slot of which incloses a pin or stud, $o$, projecting from and firmly attached to frame C. To one of these cams D, or to the rod G, is rigidly attached a handle or lever, F, as shown in Fig. 1. By turning the lever F down to the position indicated by red lines in Fig. 1 the cam D is turned on its pivot G, thereby depressing or forcing the stud $o$, and with it the frame C and its casters downward, so that the machine is made to stand upon the casters $a$, or, more strictly speaking, the frame C is depressed until the casters $a$ strike the floor, when, by continuing the movement of the lever F, the machine is raised bodily off its feet $p$, and thereby left standing upon the casters $a$, in which position it is retained by the lever F catching under the projection or spring $h$, where the latter is securely held until released by the operator. While in this condition the machine or implements, whatever it may be, can be readily and easily moved wherever desired, and this may be accomplished even by a child, as no lifting is required. When in the desired place, and when the machine is to be used for sewing, the lever F is released from the catch $h$ and turned up again to its original position, where it is retained by its end being allowed to spring into a notch or recess in the projection $h$. By this means the machine is made to rest firmly upon its feet $p$, as before.

The object of locating the cams and lever at the lower portion of the machine-frame is to enable me to avail myself of the use of the rod G, which is necessarily already there. In Fig. 2, I have shown the cams and lever attached at the upper end of the frame A, close under the table B, which will render it more convenient, as the operator will be saved the necessity of stooping in order to operate the lever F, as would be necessary when attached as shown in Fig. 1. In the plan shown in Fig.

2 the cams D and lever F' are attached to another rod, G', located at or near the upper portion of the frame A. The frame C is also provided with a stem or rod, E, secured rigidly at its lower end to C, while at its upper end works in and is guided in its vertical movement by a proper hole through the upper crossbar of A, and extending up into the under side of B, as shown in dotted line in Fig. 2. In this case the slots and pins at the upper end of C may be dispensed with, as C is prevented from any lateral displacement by the rod E, which has a firm bearing at its upper end, as already explained. The rod E' is provided with a proper projection or stud, o', which enters the slot in cam D', as in the former instance. The operation is precisely similar to that already described, it only being necessary to turn the lever F' down, as indicated in red lines in Fig. 2.

If desired, the rod G' and the cams D may be entirely dispensed with by attaching the stem E to a lever, pivoted as shown by F''', Fig. 1. In this case, however, a separate lever would be required at each end of the machine, as only one pair of casters would be adjusted by one lever.

If desired, the rod G' might be secured to the upper ends of the two stems E—one at each end of the machine—and the lever F'' be then pivoted to the rod G' midway of the length of said rod, by which arrangement one lever might be made to operate both pairs of casters; but this arrangement I deem inferior to that shown in Fig. 2.

In applying my invention to those machines mounted upon what are known as "cabinet-cases" the adjustable casters will of course be attached to the inside of the case, a proper provision being made for them to pass through the bottom, if the case have any.

In making frames with the intention of applying this invention, provision may be made for attaching the parts together in such a way as to dispense with the slots $e$ and pins $d$. One of the simplest and most obvious methods of doing this is shown by Figs. 4 and 5, which represent transverse sections of frames A and C, taken in the line $xx$, Fig. 2. In such cases a small projection will be cast upon the face of A or C for the purpose of forming the tongue $a'$, Fig. 4, or $d'$, Fig. 5, which will engage with and work in a corresponding groove in the opposite frame. As this tongue and groove need to be only equal in length to the movement of the adjustable parts, the expense of making them will be but a trifle.

The casters may be applied direct to the feet of the implement, and the adjustable frame be provided with fixed or rigid feet, upon which the implement may be made to rest when desired; but that would be a mere modification, and one which I do not deem desirable.

My invention may be applied to melodeons, harmoniums, melopœans, and similar musical implements in which treadles are used and which cannot well be allowed to rest upon casters when in use. It may also be applied to billiard-tables and all articles of household furniture, and I intend to so apply it.

Fig. 6 represents the leg of a billiard-table or of a musical instrument when the latter is put up in what are known as "piano-cases," showing my invention applied and operated by means of a rod passing longitudinally through the center of the leg.

I do not wish to be understood as confining myself to any particular method of attaching or applying my invention, as it is obvious that many other mechanical arrangements or devices may be substituted for those shown and made to produce the desired result. Neither do I wish to be understood as claiming to be the inventor of the devices used for operating the adjustable parts, as they are well known; but,

Having thus described my invention and several methods of applying it, what I claim as new and of my invention, and for which I desire to obtain Letters Patent, is—

So attaching caster-wheels to sewing-machines, tables, and other household or musical implements that the weight of said implement may be thrown on or off of said wheels at pleasure, substantially as specified.

WILLIAM C. DODGE.

Witnesses:
R. D. O. SMITH,
JNO. H. McCUTCHEN.